United States Patent [19]
Sakanoue et al.

[11] Patent Number: 6,140,813
[45] Date of Patent: *Oct. 31, 2000

[54] ROTATING MAGNETIC OBJECT MOTION SENSOR WITH UNBALANCED BIAS

[75] Inventors: Hiroshi Sakanoue; Noriaki Hayashi; Izuru Shinjo; Naoki Hiraoka; Wataru Fukui; Yutaka Ohashi, all of Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/742,488

[22] Filed: Nov. 1, 1996

[30] Foreign Application Priority Data

Jun. 25, 1996 [JP] Japan .................................. 8-164757

[51] Int. Cl.[7] .............................. G01P 3/44; G01P 3/488; G01B 7/30; G01D 5/14
[52] U.S. Cl. .................. 324/174; 324/207.2; 324/207.25
[58] Field of Search .......................... 324/207.2, 207.21, 324/207.25, 173, 174, 251, 252

[56] References Cited

U.S. PATENT DOCUMENTS

| | | | |
|---|---|---|---|
| 4,725,776 | 2/1988 | Onodera et al. | 324/252 X |
| 5,021,736 | 6/1991 | Gonsalves et al. | 324/207.21 X |
| 5,045,920 | 9/1991 | Vig et al. | 324/207.2 X |
| 5,192,877 | 3/1993 | Bittebierre et al. | 324/207.2 X |
| 5,596,272 | 1/1997 | Busch | 324/207.21 |
| 5,614,821 | 3/1997 | Leiderer | 324/207.2 X |

FOREIGN PATENT DOCUMENTS

| | | |
|---|---|---|
| 0598934 | 6/1994 | European Pat. Off. . |
| 3041041 | 5/1982 | Germany . |
| 3521966 | 1/1987 | Germany . |
| 4025837 | 2/1992 | Germany ............................. 324/207.2 |
| 227116 | 11/1985 | Japan ................................... 324/207.2 |
| 3-28631 | 3/1991 | Japan . |
| 3-48715 | 5/1991 | Japan . |
| 6-273437 | 9/1994 | Japan . |
| 6-76865 | 10/1994 | Japan . |
| 7-198736 | 8/1995 | Japan . |

Primary Examiner—Gerard Strecker
Attorney, Agent, or Firm—Sughrue, Mion, Zinn, Macpeak & Seas, PLLC

[57] ABSTRACT

A magnetic object motion sensor which can operate with high accuracy not only when a magnetic object moves at high speeds but also even when it moves at low speeds, which can be produced with a greater production tolerance and a greater dimensional tolerance. The magnetic object motion sensor includes: magnetoelectric transducer elements disposed opposite protrusions of a moving magnetic object; a magnet for generating bias magnetic flux toward the magnetoelectric transducer elements; unbalanced bias producing means for producing imbalance in the magnetic field sensitivity between the magnetoelectric transducer elements; a differential amplifier for amplifying in a differential fashion the electric signals output by the magnetoelectric transducer elements; a waveform shaping circuit for converting the differential signal output by the differential amplifier to a pulse signal corresponding to the edges of the magnetic material protrusion; the unbalanced bias producing means producing a difference in the amplitude of the magnetic flux density between that applied to one element of the pair of magnetoelectric transducer elements and that applied to the other element so that the difference in the electric signal level corresponding to the difference in the amplitude of the magnetic flux density becomes greater than the hysteresis of the waveform shaping circuit, thereby, in effect, introducing imbalance in the sensitivity between the magnetoelectric transducer elements.

1 Claim, 11 Drawing Sheets

ROTATING MAGNETIC OBJECT MOTION SENSOR WITH UNBALANCED BIAS

BACKGROUND OF THE INVENTION

1. Field of the Invention

The present invention relates to a magnetic object motion sensor including a pair of magnetoelectric transducer elements for detecting for example the rotation of a cam shaft of an internal combustion engine, and more particularly, to a magnetic object motion sensor which can output a high-precision pulse signal which precisely corresponds to the motion of the object to be detected, and which can be produced with a greater tolerance in structure and production and thus at low cost.

2. Description of the Related Arts

FIG. 12 is a cross-sectional view illustrating a conventional magnetic object motion sensor as disclosed in Japanese Patent Laid-Open Nos. 7-198736 and 6-273437. In this specific example, the magnetic object motion sensor is disposed opposite to a rotating magnetic object so as to serve as a rotation detector for detecting the rotation of the rotating magnetic object. FIG. 13 is a side view illustrating the position of the rotation sensor relative to the position of the rotating magnetic object shown in FIG. 12.

As shown in FIGS. 12 and 13, a moving magnetic object serving as a rotating magnetic object 1 has a plurality of magnetic material protrusions 1a disposed at equal intervals along its periphery.

A pair of magnetoelectric transducer elements, such as Hall devices, 2a and 2b are disposed a predetermined distance D apart from each other in the direction, denoted by "A", of the motion of the rotating magnetic object 1 so that the magnetoelectric transducer elements 2a and 2b face the magnetic material protrusions 1a disposed along the periphery of the rotating magnetic object 1. Each magnetoelectric transducer element 2a and 2b detects a change in magnetic field caused by the motion of the magnetic material protrusions 1a, and outputs an electric signal (which will be described in detail later) corresponding to the change in the magnetic field.

Both magnetoelectric transducer elements 2a and 2b are included in an integral fashion in a sensor IC 3, which also includes other various circuit elements (which will be described later).

A permanent magnet 4 magnetized in the direction denoted by the arrow B (refer to FIG. 13) is disposed adjacent to the sensor IC 3 so that a bias magnetic field is supplied to each magnetoelectric transducer element 2a and 2b.

The rotation sensor is constructed with the sensor IC 3 including the pair of magnetoelectric transducer elements 2a and 2b and the permanent magnet 4 for generating the bias magnetic field. The rotation sensor is held in an integral fashion by a holding member 5 so that the rotation sensor is maintained at the specific position described below relative to the rotating magnetic object 1.

The above components are disposed so that the central axis of the sensor IC 3 and the permanent magnet 4 passing between the center of the magnetoelectric transducer elements 2a and 2b is coincident with the central axis C in a radial direction of the rotating magnetic object 1. The side face of the permanent magnet 4 facing the rotating magnetic object 1 is parallel to the line from one element to the other of the two magnetoelectric transducer elements 2a and 2b and also parallel to the tangential direction E of rotation movement of the rotating magnetic object 1.

Therefore, the magnetization direction of the permanent magnet 4 is coincident with the direction of the central axis C.

FIG. 14 is a circuit diagram illustrating a typical circuit configuration of the sensor IC 3.

As shown in FIG. 14, the sensor IC 3 has a power supply terminal Vcc via which a power supply voltage is supplied from an external circuit (not shown), a ground terminal GND connected to ground, and an output terminal Vout via which a pulse signal P is output.

The sensor IC 3 also includes: a pair of amplifiers 6a and 6b for separately amplifying electric signals Fa and Fb output by the pair of magnetoelectric transducer elements 2a and 2b; a differential amplifier 7 for amplifying in a differential fashion the electric signals Ga and Gb output by the respective amplifiers 6a and 6b; a waveform shaping circuit 8 for converting the differential signal H output by the differential amplifier 7 into a pulse signal J corresponding to the edges of the magnetic material protrusions 1a; and a transistor 9 with a grounded emitter for inverting the pulse signal J and outputting the resulting signal as a pulse signal P.

The magnetoelectric transducer elements 2a and 2b, the amplifiers 6a and 6b, the differential amplifier 7, and the waveform shaping circuit 8 are connected to the power supply terminal Vcc and also to the ground terminal GND so that electric power is supplied to these circuit elements.

The pulse signal P output from the transistor 9 via the output terminal Vout is further converted by an external circuit to a pulse signal having a final form.

The operation of the conventional magnetic object motion sensor shown in FIGS. 12 to 14 is described below with reference to the waveform diagrams of FIGS. 15 and 16.

FIGS. 15 and 16 illustrate the relationships among the magnetic material protrusions 1a of the rotating magnetic object 1, the differential signal H input to the waveform shaping circuit 8, and the pulse signal J shaped by the waveform shaping circuit, wherein FIG. 16 illustrates those relationships for the case in which the rotating magnetic object 1 rotates at a low speed.

In FIGS. 15 and 16, TH denotes a threshold level at which the pulse signal J is switched from a high level (H-level) to a low level (L-level), TL denotes a threshold level at which the pulse signal J is switched from a low level to a high level, and ΔT denotes the hysteresis or the difference between the above threshold levels TH and TL.

As shown in FIG. 16, the circuit characteristic of the sensor IC 3 has the feature that undershoot Hu and overshoot Ho occur in the differential signal H in particular when the rotating magnetic object 1 rotates at a low speed.

When the rotating magnetic object 1 rotates in the direction indicated by the arrow A, the pair of magnetoelectric transducer elements 2a and 2b detects the change in the magnetic field caused by the motion of the magnetic material protrusions 1a of the rotating magnetic object 1, and outputs electric signals Fa and Fb whose voltage changes in response to the change in the magnetic field.

The electric signals Fa and Fb are amplified by the amplifiers 6a and 6b and output as electric signals Ga and Gb, which are further amplified in a differential fashion by the differential amplifier 7 and output as a differential signal H. The differential signal H is then applied to the waveform shaping circuit 8 constructed with for example a Schmitt trigger circuit.

The waveform shaping circuit 8 compares the differential signal H with the threshold levels TH and TL, and converts the differential signal H to a pulse signal J corresponding to the edges of the magnetic material protrusions 1a.

More specifically, when the differential signal H has become higher than the threshold TH, the pulse signal J is made to fall down to a low level (L level). On the other hand, when the differential signal H has become lower than the threshold TL, the pulse signal J is made to rise up to a high level (H level).

The pulse signal J is then inverted by the transistor 9 into a pulse signal P which is then supplied via the output terminal Vout to an external computer unit or a similar device so as to detect the rotation speed or the rotation angle of the rotating magnetic object 1.

However, as can be seen from FIG. 15, the threshold levels TH and TL associated with the waveform shaping circuit 8 are located in the range in which the differential signal H changes rather gradually. As a result, a small change in level of the differential signal H results in a shift of the pulse signal J in a δ direction, which causes degradation in the detection accuracy of the rotation of the rotating magnetic object 1. Therefore, it is required that the structural accuracy such as the attachment accuracy of the sensor IC 3 should be extremely high. This results in an increase in cost.

Furthermore, when the rotating magnetic object 1 rotates at a low speed, undershoot Hu or overshoot Ho often occurs in the differential signal H as shown in FIG. 16. If such undershoot or overshoot occurs, the waveform shaping circuit 8 responds to the undershoot Hu or the overshoot Ho, and thus the pulse signal J greatly deviates from the normal pulse position (denoted by the alternate long and short dash line in FIG. 16), which results in degradation in rotation detection accuracy.

In the conventional magnetic object motion sensor, as described above, since the waveform shaping is performed in the range in which the differential signal H changes gradually, it is difficult to generate a pulse signal J which precisely corresponds to the edges of the magnetic material protrusions 1a. Although a high-precision pulse signal can be achieved if a high-precision manufacturing process is employed, such process is very expensive.

Furthermore, when the moving magnetic object rotates at a low speed, the waveform shaping circuit incorrectly responds to undershoot or overshoot in the differential signal H, and it becomes impossible to output a pulse signal J which precisely corresponds to the edges of the magnetic material protrusions 1a.

SUMMARY OF THE INVENTION

It is a general object of the present invention to solve the above problems. More specifically, it is an object of the present invention to provide a high-precision magnetic object motion sensor, which allows a greater production tolerance and a greater dimensional tolerance, and which can therefore be manufactured at low cost.

According to an aspect of the present invention, there is provided a magnetic object motion sensor comprising: a pair of magnetoelectric transducer elements disposed opposite a magnetic material protrusion of a moving magnetic object; a magnet for generating bias magnetic flux toward the pair of magnetoelectric transducer elements; unbalanced bias producing means for producing imbalance in the magnetic field sensitivity between the pair of magnetoelectric transducer elements; a differential amplifier for amplifying in a differential fashion the electric signals output by the pair of magnetoelectric transducer elements; and a waveform shaping circuit for converting the differential signal output by the differential amplifier to a pulse signal corresponding to the edges of the magnetic material protrusion; the pair of magnetoelectric transducer elements being disposed in such a manner that one element is a predetermined distance apart from the other in the direction of motion of the moving magnetic object so that the pair of magnetoelectric transducer elements detect a change in magnetic flux caused by the motion of the magnetic material protrusion, the unbalanced bias producing means producing a difference in the amplitude of the magnetic flux density between that applied to one element of the pair of magnetoelectric transducer elements and that applied to the other element so that the difference in the electric signal level corresponding to the difference in the amplitude of the magnetic flux density becomes greater than the hysteresis of the waveform shaping circuit.

In the magnetic object motion sensor of the invention, a difference occurs between the amplitudes of the magnetic flux applied to the respective magnetoelectric transducer elements and thus the magnetoelectric transducer elements are, in effect, unbalanced.

This allows a greater production tolerance and a greater dimensional tolerance. Furthermore, the moving magnet object sensor can operate with high accuracy even when the magnetic object moves at low speeds.

Preferably, the above unbalanced bias producing means includes a structure in which the line from the center of one element to the center of the other element of the pair of magnetoelectric transducer elements is slanted with respect to the direction of motion of the moving magnetic object.

The unbalanced bias producing means may also include a structure in which a side face of the magnet is slanted with respect to the direction of motion of the moving magnetic object.

The unbalanced bias producing means may also include a structure in which the magnet is magnetized in a direction slanted with respect to the normal to the surface of the moving magnetic object.

The unbalanced bias producing means may include a structure in which the position of the central axis of the pair of magnetoelectric transducer elements and the position of the central axis of the magnet are offset from each other.

Furthermore, the moving magnetic object may be a rotating magnetic object, and the unbalanced bias producing means may include a structure in which the position of the central axis of the pair of magnetoelectric transducer elements and the position of the central axis of the magnet are both offset from the position of the central axis in a radial direction of the rotating magnetic object.

According to another aspect of the present invention, there is provided a magnetic object motion sensor comprising: a pair of magnetoelectric transducer elements disposed opposite a magnetic material protrusion of a moving magnetic object; a magnet for generating bias magnetic flux toward the pair of magnetoelectric transducer elements; a pair of amplifiers for separately amplifying the electric signals output by the pair of magnetoelectric transducer elements; a differential amplifier for amplifying in a differential fashion the electric signals output via the pair of amplifiers; and a waveform shaping circuit for converting the differential signal output by the differential amplifier to a pulse signal corresponding to the edges of the magnetic material protrusion; the pair of magnetoelectric transducer elements being disposed in such a manner that one element is a predetermined distance apart from the other in the direction of motion of the moving magnetic object so that the pair of magnetoelectric transducer elements detect a change in magnetic flux caused by the motion of the magnetic material protrusion, the unbalanced bias producing means producing a difference in the amplitude of the magnetic flux density between that applied to one element of the pair of magnetoelectric transducer elements and that applied to the other element so that the difference in the electric signal level corresponding to the difference in the amplitude of the magnetic flux density becomes greater than the hysteresis of the waveform shaping circuit.

With this arrangement, a difference also occurs between the amplitudes of the magnetic flux applied to the respective magnetoelectric transducer elements and thus the sensitivity is, in effect, unbalanced between the magnetoelectric transducer elements.

DESCRIPTION OF THE PREFERRED EMBODIMENTS

Embodiment 1

With reference to the accompanying drawings, a first embodiment of a rotation sensor according to the present invention will be described below.

Figure 1:
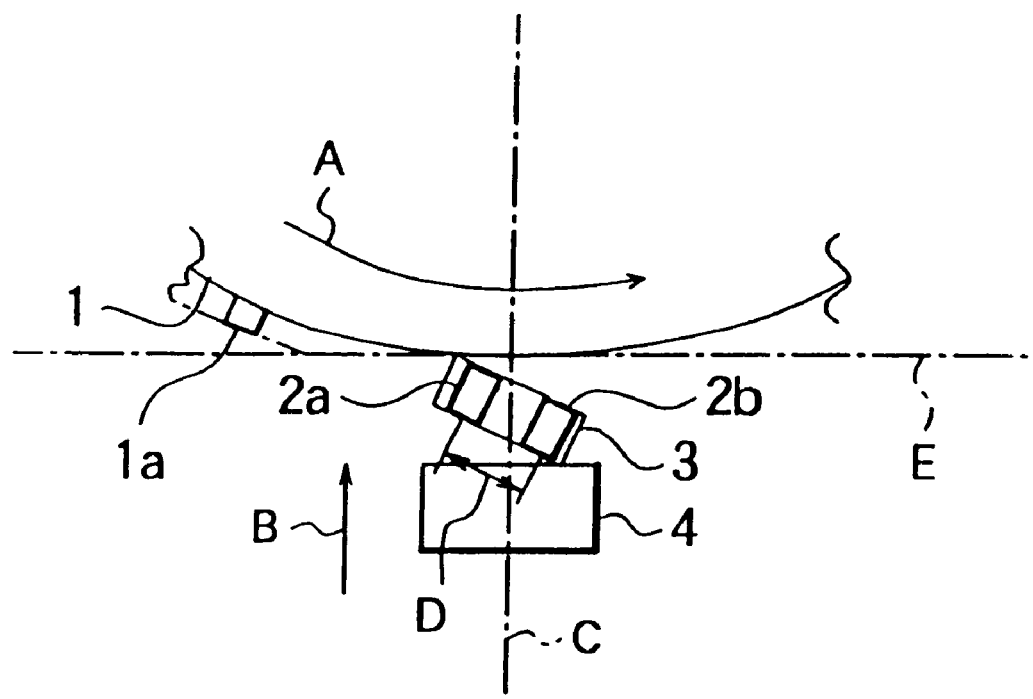
FIG. 1 is a side view illustrating the main part of a first embodiment according to the present invention.

FIG. 1 is a cross-sectional view illustrating the main portion of the first embodiment of the invention. In this specific embodiment, the magnetic object motion sensor is, by way of example, of the rotation sensor type.

In this first embodiment of the invention (and also in other embodiments which will be described later), a sensor IC 3 having a similar circuit configuration to that described above with reference to in FIG. 14 is also employed. In the figures which will be referred to in this and other embodiments, constituent elements similar to those described above in connection with the conventional technique are denoted by similar reference numerals and they are not described here in further detail.

Figure 2:
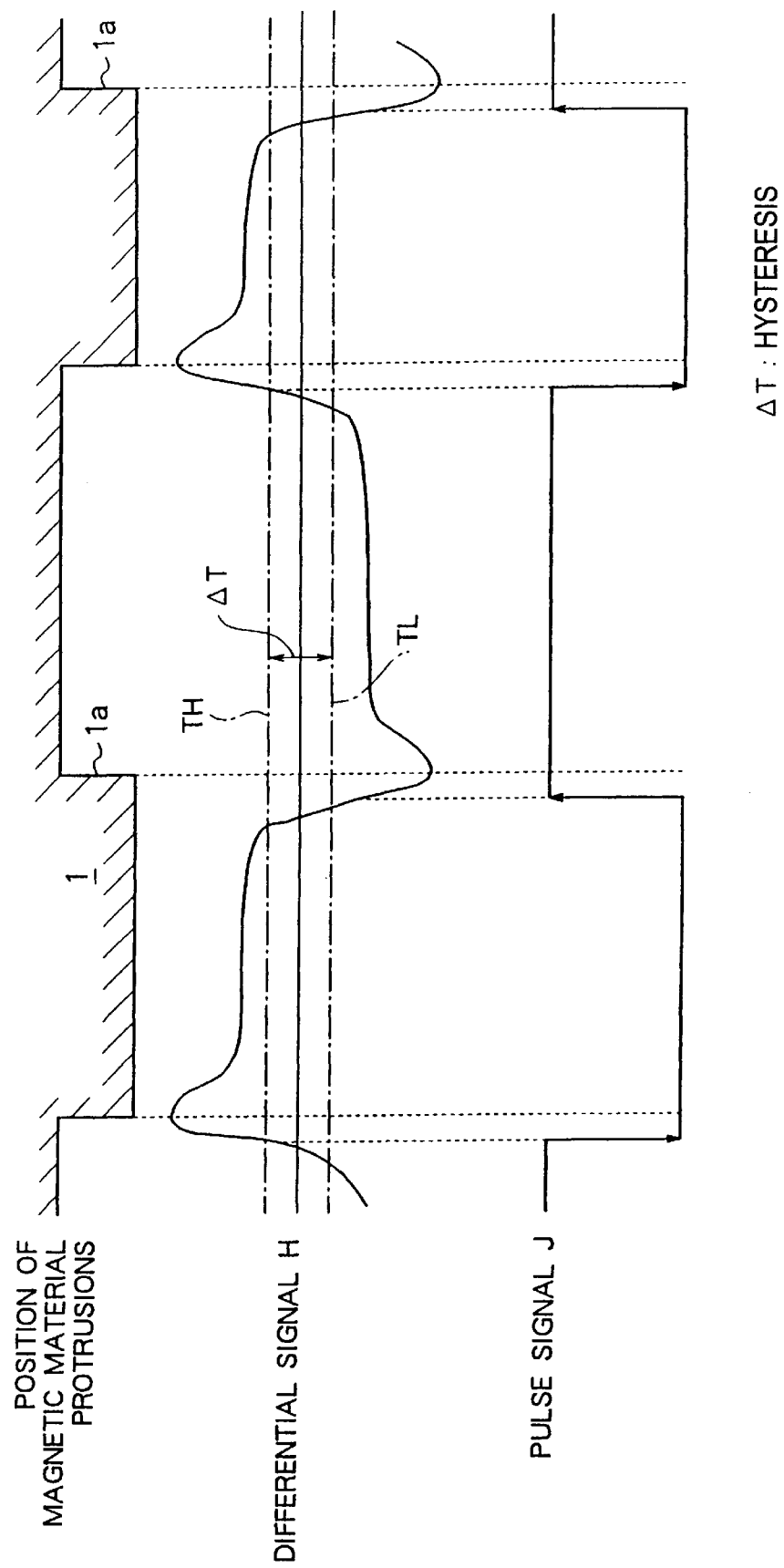
FIG. 2 is a waveform diagram illustrating a differential signal and a pulse signal obtained, in a high speed operation, by the first embodiment of the invention.
Figure 3:
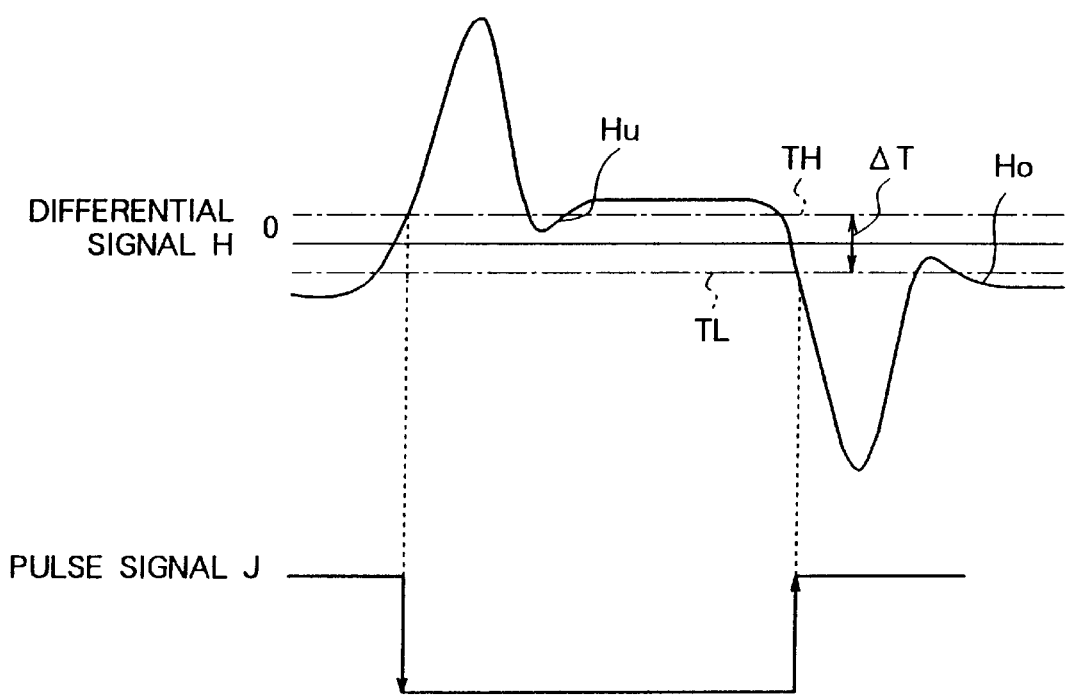
FIG. 3 is a waveform diagram illustrating a differential signal and a pulse signal obtained, in a low speed operation, by the first embodiment of the invention.

FIGS. 2 and 3 illustrate the relationships among the magnetic material protrusions 1a of the rotating magnetic object 1, the differential signal H input to the waveform shaping circuit 8 (refer to FIG. 14), and the pulse signal J shaped by the waveform shaping signal, wherein FIG. 3 illustrates those relationships for the case in which the rotating magnetic object 1 rotates at a low speed.

Figure 15:
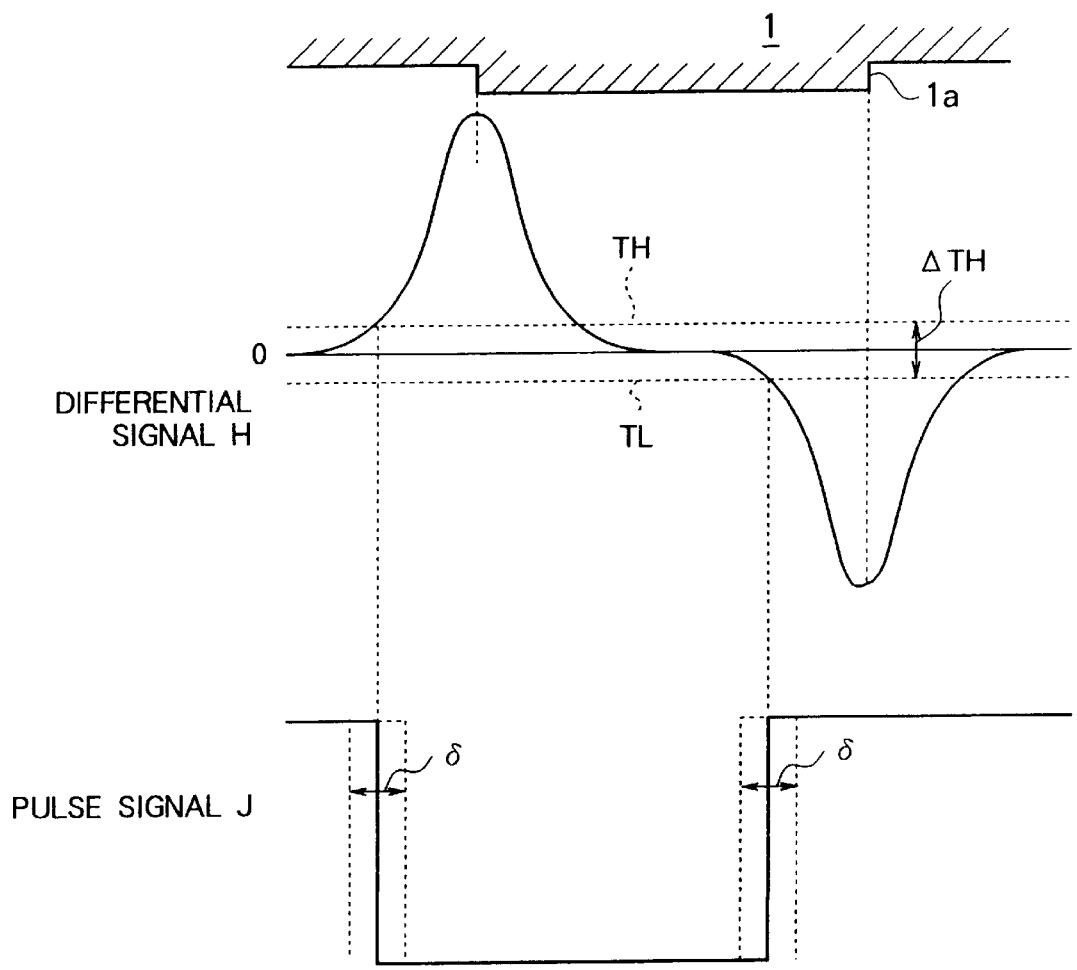
FIG. 15 is a waveform diagram illustrating a differential signal and a pulse signal obtained, in a high speed operation, by the conventional magnetic object motion sensor.
Figure 16:
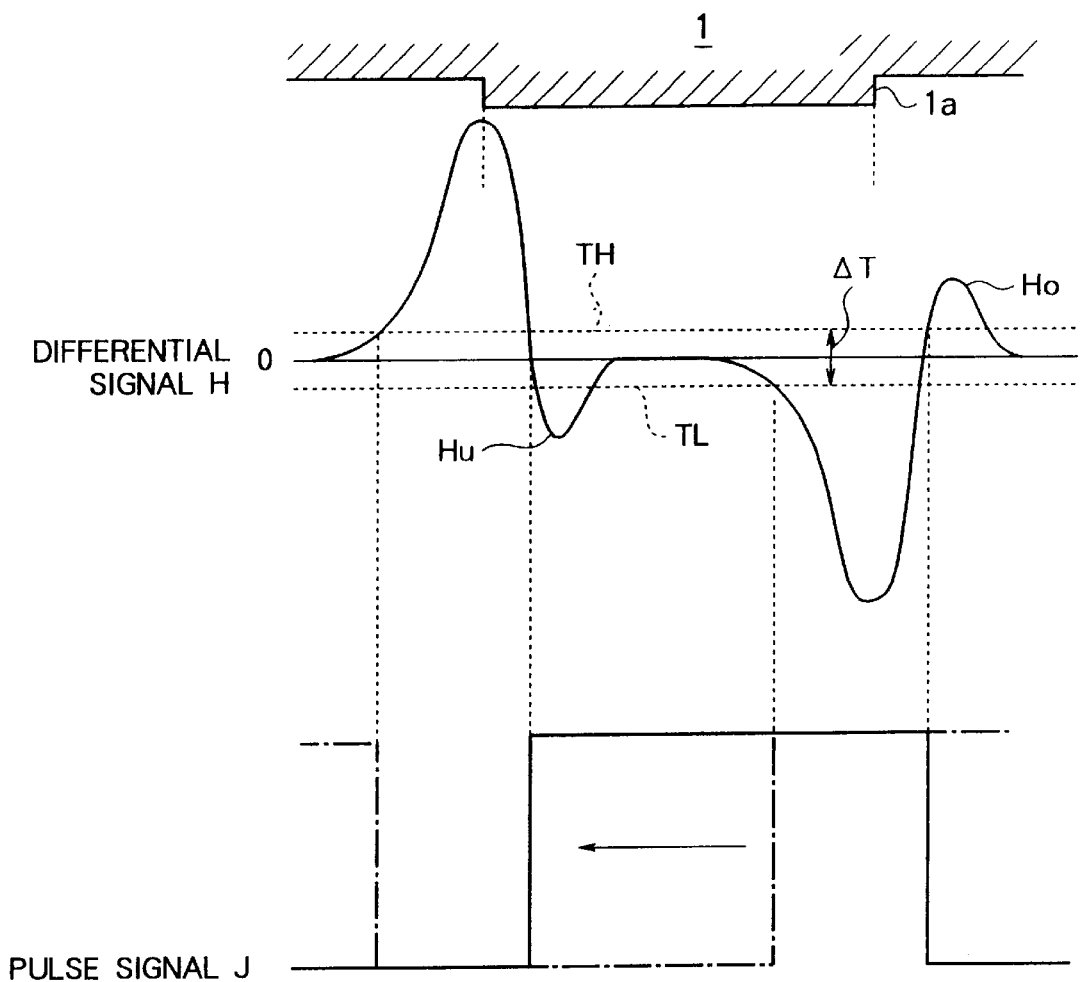
FIG. 16 is a waveform diagram illustrating a differential signal and a pulse signal obtained, in a low speed operation, by the conventional magnetic object motion sensor.

In this embodiment, there is provided unbalanced bias means for producing a difference between the magnetic flux density applied to the magnetoelectric transducer element 2a and that applied to the magnetoelectric transducer element 2b thereby producing imbalance in the sensitivity to the magnetic field between the pair of the magnetoelectric transducer elements 2a and 2b so that the above imbalance results in a signal level greater than the hysteresis $\Delta T$ of the waveform shaping circuit 8 (refer to FIG. 15).

Referring to FIG. 1, the unbalanced bias means is realized by slanting the line between the pair of magnetoelectric transducer elements 2a and 2b with respect to the direction of motion (tangential direction E of rotation movement) of the rotating magnetic object 1.

In the specific example shown in FIG. 1, the sensor IC 3 is disposed in a slanted position so that the magnetoelectric transducer element 2a at the leading edge is located nearer to the rotating magnetic object 1 than the other magnetoelectric transducer element 2b at the trailing edge (the term "leading edge" is used here to describe the edge or the end portion which meets the magnetic material protrusions 1a earlier than the other edge or the trailing edge).

On the other hand, the permanent magnet 4 is disposed such that its front side is parallel to the tangential direction E of rotation movement of the rotating magnetic object 1 and thus the magnetization direction B of the permanent magnet 4 is parallel to the central axis of the permanent magnet 4 or the central axis C in a radial direction of the rotating magnetic object 1. The term "front side" is used here to describe the side nearer to the rotating magnetic object 1 rather than the other side or "back side".

In the construction shown in FIG. 1, the slant of the sensor IC 3 with respect to the tangential direction E of rotation movement of the rotating magnetic object 1 is adjusted for example within the range from 5° to 60° (typically about 30°) so that a difference occurs between the amplitudes of the magnetic fields applied to the magnetoelectric transducer elements 2a and 2b thereby creating a difference in the signal level greater than the hysteresis $\Delta T$.

In effect, imbalance occurs in sensitivity between the magnetoelectric transducer elements 2a and 2b. As a result, as shown in FIG. 2, the differential signal H has a waveform in which a bias component is superimposed on the positive and negative signal levels.

Therefore, the waveform shaping circuit 8 compares the differential signal H with the threshold levels TH and TL in the range in which the differential signal H changes abruptly, and generates a pulse signal J in accordance with the comparison result.

This results in an improvement in the conversion performance from the differential signal H to the pulse signal J, and therefore it becomes possible to more precisely detect both edges of magnetic material protrusions 1a.

As a result, a greater structural tolerance for example in attachment of the sensor is allowed, and thus cost can be reduced.

Furthermore, even if undershoot Hu occurs in differential signal H in operation at low rotation speeds as shown in FIG. 3, the undershoot Hu has little chance of becoming lower than the threshold level TL, and therefore there is no possibility that the pulse signal J is influenced by the undershoot Hu.

Similarly, even if overshoot Ho occurs in differential signal H, the overshoot Ho has little chance of becoming higher than the threshold level TH, and therefore there is no possibility that the pulse signal J is influenced by the overshoot Hu.

As a result, the pulse signal J or P has higher detection accuracy in the low rotation speed range.

In this embodiment, although a rotating magnetic object 1 is employed as the moving magnetic object, other types of moving magnetic objects such as a magnetic object moving along a linear path may also be employed as long as similar magnetic material protrusions are provided on the moving magnetic object.

In this case, the tangential direction E of rotation movement of the above-described rotating magnetic object 1 corresponds to the movement direction of the moving magnetic object.

Embodiment 2

In the first embodiment described above, the sensor IC 3 is disposed in a slanted position so that the magnetoelectric transducer element 2a at the leading edge is located nearer to the rotating magnetic object 1 than the other magnetoelectric transducer element 2b at the trailing edge. However, the sensor IC 3 may also be slanted in the opposite direction.

Figure 4:
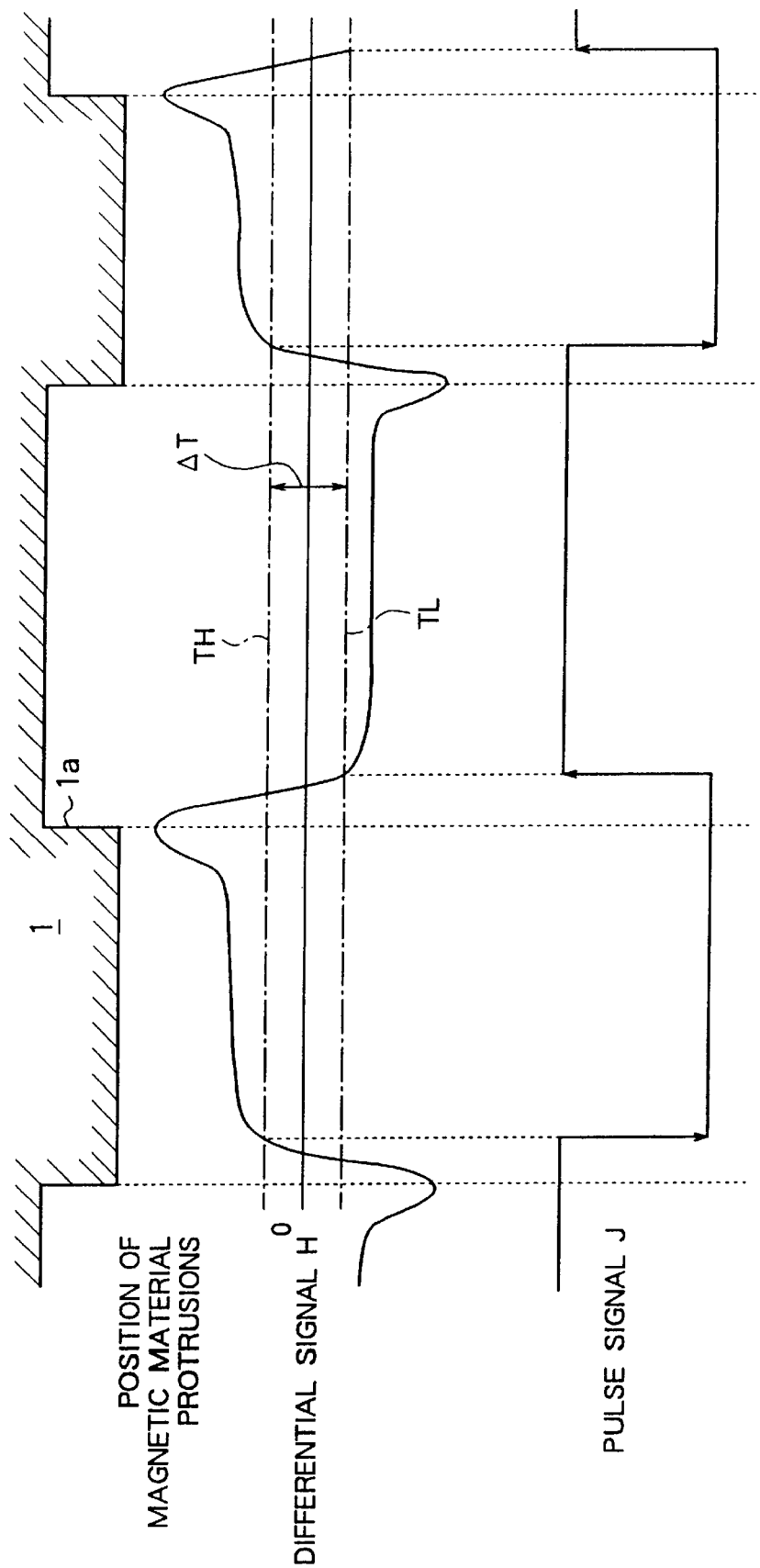
FIG. 4 is a waveform diagram illustrating a differential signal and a pulse signal obtained in a second embodiment according to the present invention (in which the unbalanced bias is inverted from that of the first embodiment)

Thus, in this second embodiment, the sensor IC 3 is disposed in an opposite slanted position. In this case, the signals have waveforms such as shown in FIG. 4., in which unbalanced bias opposite in polarity to that employed in the first embodiment described above is applied to the differential signal H and as a result the threshold levels TH and TL are located near the range in which the differential signal H changes gradually.

In this arrangement, although the allowable structural tolerance decreases compared to that allowed in the first embodiment described above, the sensor can generate a precise pulse signal even if overshoot Ho or undershoot Hu (refer to FIG. 3) occurs without being disturbed by the overshoot or undershoot.

Embodiment 3

In the first embodiment described above, the unbalanced bias means is realized by slanting the front surface of the sensor IC 3 (the line between the magnetoelectric transducer elements 2a and 2b) with respect to the tangential direction E of rotation movement.

Instead, in this third embodiment, the front surface of the permanent magnet 4 is slanted with respect to the tangential direction E of rotation movement.

Figure 5:
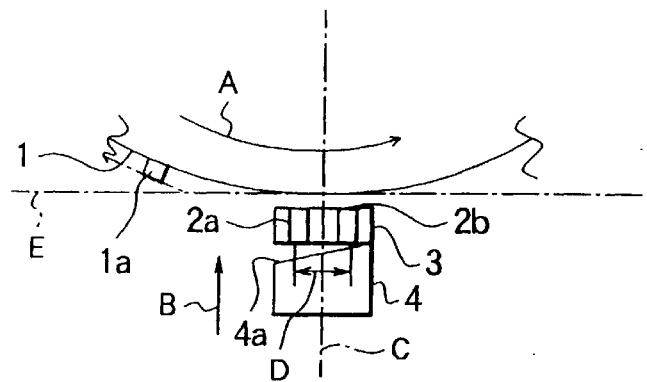
FIG. 5 is a side view illustrating the main part of a third embodiment according to the present invention.

FIG. 5 is a side view illustrating the main part of the third embodiment according to the present invention.

In operation, the third embodiment (and also other embodiments which will be described later) has waveforms similar to those shown in FIGS. 2 to 4.

In FIG. 5, the sensor IC 3 including the magnetoelectric transducer elements 2a and 2b is disposed so that its front surface is parallel to the tangential direction E of rotation movement of the rotating magnetic object 1. The magnetization direction B of the permanent magnet 4 is parallel to the central axis of the sensor IC 3 or the central axis C in the radial direction of the rotating magnetic object 1.

On the other hand, the permanent magnet 4 is disposed so that its front surface 4a is slanted with respect to the tangential direction E of rotation movement of the rotating magnetic object 1. More specifically, in this specific embodiment, the front surface 4a is slanted in such a manner that the leading end of the front surface 4a is farther apart from the rotating magnetic object 1 than the trailing end.

In this embodiment, the slant of the front surface 4a of the permanent magnet 4 is adjusted for example within the range from 5° to 60° with respect to the tangential direction E of rotation movement of the rotating magnetic object 1 so that a difference occurs between the amplitudes of the magnetic flux density applied to the magnetoelectric transducer elements 2a and 2b.

In the specific example shown in FIG. 5, the amplitude of the magnetic flux density applied to the magnetoelectric transducer element 2b is greater than that applied to the magnetoelectric transducer element 2a.

This makes it possible to more precisely detect both edges of the magnetic material protrusions 1a and thus the detection performance (accuracy) of rotation is improved. Furthermore, the detection accuracy at low rotation speeds is also improved, and a greater tolerance is allowed in attachment of the sensor.

Embodiment 4

Figure 6:
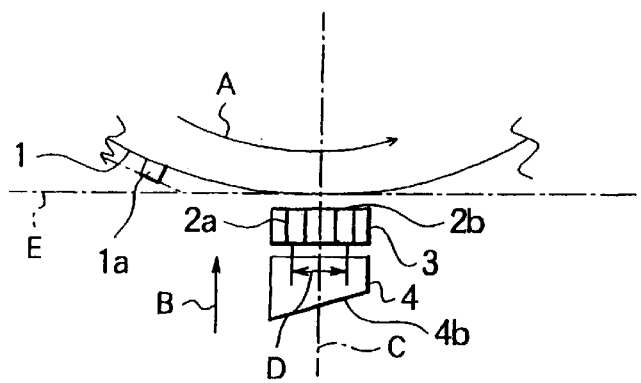
FIG. 6 is a side view illustrating the main part of a fourth embodiment according to the present invention.

In the third embodiment described above, the unbalanced bias means is realized by slanting the front surface 4a of the permanent magnet 4. Instead, in this fourth embodiment, the back surface 4b of the permanent magnet 4 is slanted. FIG. 6 is a side view illustrating the main part of the fourth embodiment according to the present invention. In this embodiment, as shown in FIG. 6, the back surface 4b, or the surface farther apart from the rotating magnetic object 1 than the opposite surface, of the permanent magnet 4 is slanted with respect to the tangential direction E of rotation movement such that the leading edge of the back surface 4b is farther apart from the rotating magnetic object 1 than the trailing edge.

In this embodiment, as described above, the slant of the back surface 4b of the permanent magnet 4 is adjusted for example within the range from 5° to 60° with respect to the tangential direction E of rotation movement of the rotating magnetic object 1 so that a difference occurs between the amplitudes of the magnetic flux density applied to the magnetoelectric transducer elements 2a and 2b.

In the example shown in FIG. 6, the amplitude of the magnetic flux density applied to the magnetoelectric transducer element 2a is greater than that applied to the magnetoelectric transducer element 2b.

As in the previous embodiments, it is possible to precisely detect both edges of the magnetic material protrusions 1a and thus the detection performance (accuracy) of rotation is improved. Furthermore, the detection accuracy at low rotation speeds is also improved, and a greater tolerance is allowed in attachment of the sensor.

Embodiment 5

In the third and fourth embodiments described above, the unbalanced bias means is realized by slanting only one surface, that is, either the front surface 4a or the back surface 4b of the permanent magnet 4 with respect to the tangential direction E of rotation movement of the rotating magnetic object 1.

Instead, in this fifth embodiment, both surfaces 4a and 4b of the permanent magnet 4 are slanted.

Figure 7:
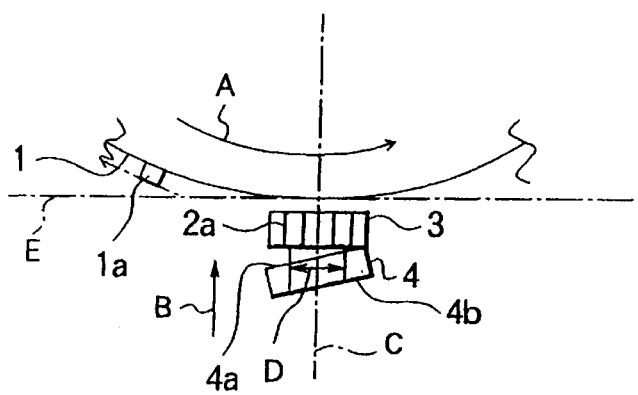
FIG. 7 is a side view illustrating the main part of a fifth embodiment according to the present invention.

FIG. 7 is a side view illustrating the main part of the fifth embodiment of the invention. In this embodiment, as shown in FIG. 7, the front and back surfaces 4a and 4b of the permanent magnet 4 are both slanted with respect to the tangential direction E of rotation movement. That is, the permanent magnet 4 itself is slanted with respect to the rotating magnetic object 1.

In the arrangement shown in FIG. 7, a difference also occurs between the amplitudes of the magnetic flux density applied to the magnetoelectric transducer elements 2a and 2b. That is, the amplitude of the magnetic flux density applied to the magnetoelectric transducer element 2b is greater than that applied to the magnetoelectric transducer element 2a.

Thus, as in the previous embodiments, it is possible to precisely detect both edges of the magnetic material protrusions 1a, and the detection performance (accuracy) of rotation is improved. Furthermore, the detection accuracy at low rotation speeds is also improved, and a greater tolerance is allowed in attachment of the sensor.

Embodiment 6

In the third to fifth embodiments described above, the unbalanced bias means is realized by slanting either the front surface 4a or the back surface 4b of the permanent magnet 4 with respect to the tangential direction E of rotation movement of the rotating magnetic object 1. However, the unbalanced bias means may also be realized by slanting the direction B of the magnetization of the permanent magnet 4 with respect to the central axis C in the radial direction of the rotating magnetic object 1 (the central axis C is perpendicular to the surface of the rotating magnetic object 1).

Thus, in this sixth embodiment of the invention, the permanent magnet 4 magnetized in an slanted direction B is employed.

Figure 8:
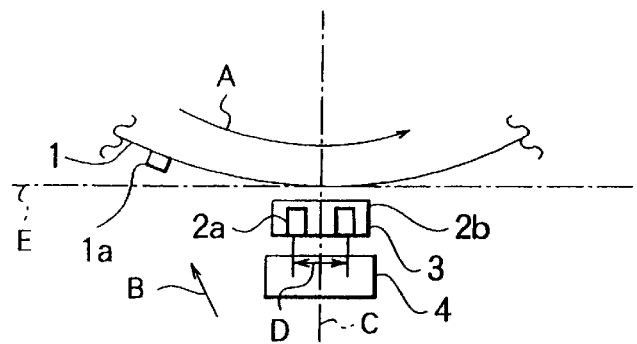
FIG. 8 is a side view illustrating the main part of a sixth embodiment according to the present invention.

FIG. 8 is a side view illustrating the main part of the sixth embodiment of the invention. In this embodiment, as shown in FIG. 8, the magnetization of the permanent magnet 4 is slanted with respect to the radial direction C of the rotating magnetic object 1.

In the specific example shown in FIG. 8, the magnetization direction B of the permanent magnet 4 is slanted to a direction opposite to the rotation movement direction A of the rotating magnetic object 1 so that a difference occurs between the amplitudes of the magnetic flux density applied to the magnetoelectric transducer elements 2a and 2b, and more specifically, so that the bias magnetic field applied to the magnetoelectric transducer element 2a is greater than that applied to the magnetoelectric transducer element 2b.

In this embodiment, as in the previous embodiments, it is possible to precisely detect both edges of the magnetic material protrusions 1a and thus the detection performance (accuracy) of rotation is improved. Furthermore, the detection accuracy at low rotation speeds is also improved, and a greater tolerance is allowed in attachment of the sensor.

Embodiment 7

In the sixth embodiment described above, the unbalanced bias means is realized by slanting the direction B of the magnetization of the permanent magnet 4 with respect to the central axis C in the radial direction of the rotating magnetic object 1. However, the unbalanced bias means may also be realized by offsetting the position of the central axis of the permanent magnet 4 from the central axis C in the radial direction of the rotating magnetic object 1 (the central axis of the sensor IC 3).

Thus, in this seventh embodiment, the central axis of the permanent magnet 4 is offset.

Figure 9:
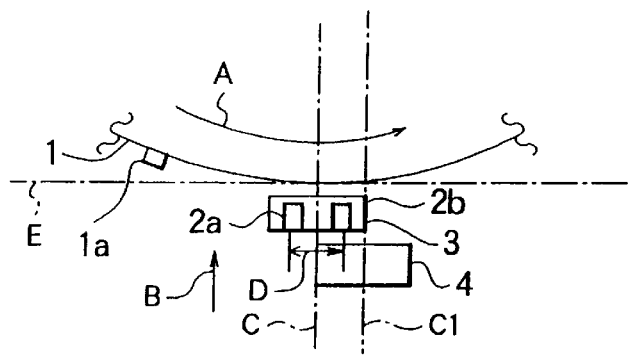
FIG. 9 is a side view illustrating the main part of a seventh embodiment according to the present invention.

FIG. 9 is a side view illustrating the main part of the seventh embodiment of the invention. In this embodiment, as shown in FIG. 9, the central axis of the permanent magnet 4 is offset with respect to the central axis of the sensor IC 3 or the central axis C in the radial direction of the rotating magnetic object 1 (to a direction parallel to the direction of rotation movement of the rotating magnetic object 1).

In the arrangement shown in FIG. 9, a difference also occurs between the amplitudes of the magnetic flux density applied to the magnetoelectric transducer elements 2a and 2b, and more specifically, the bias magnetic field applied to the magnetoelectric transducer element 2b is greater than that applied to the magnetoelectric transducer element 2a.

In this embodiment, as in the previous embodiments, it is therefore possible to precisely detect both edges of the magnetic material protrusions 1a and thus the detection performance (accuracy) of rotation is improved. Furthermore, the detection accuracy at low rotation speeds is also improved, and a greater tolerance is allowed in attachment of the sensor.

Embodiment 8

In the seventh embodiment described above, the unbalanced bias means is realized by offsetting the central axis C1 of the permanent magnet 4 from the central axis C in the radial direction of the rotating magnetic object 1 (the central axis of the sensor IC 3).

Instead, in this eighth embodiment, the central axis of the sensor IC 3 is offset from the central axis C in the radial direction of the rotating magnetic object 1 (the central axis of the permanent magnet 4).

Figure 10:
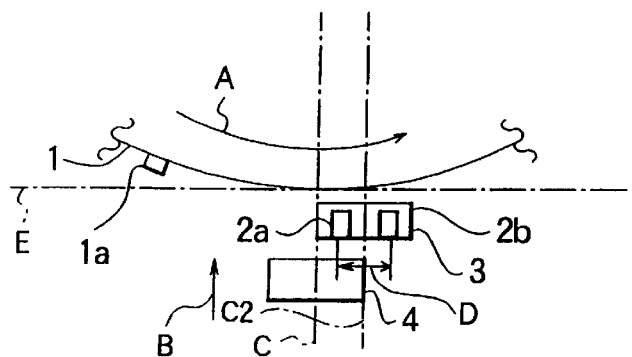
FIG. 10 is a side view illustrating the main part of an eighth embodiment according to the present invention.

FIG. 10 is a side view illustrating the main part of the eighth embodiment according to the present invention. In this embodiment, as shown in FIG. 10, the central axis C2 of the sensor IC 3 is offset from the central axis of the permanent magnet 4 or the central axis C in the radial direction of the rotating magnetic object 1.

In the arrangement shown in FIG. 10, a difference also occurs between the amplitudes of the magnetic flux density applied to the magnetoelectric transducer elements 2a and 2b, and more specifically, the bias magnetic field applied to the magnetoelectric transducer element 2a is greater than that applied to the magnetoelectric transducer element 2b.

Thus in this embodiment, as in the previous embodiments, it is also possible to precisely detect both edges of the magnetic material protrusions 1a and the detection performance (accuracy) of rotation is improved. Furthermore, the detection accuracy at low rotation speeds is also improved, and a greater tolerance is allowed in attachment of the sensor.

Embodiment 9

In the seventh and eighth embodiments described above, the unbalanced bias means is realized by offsetting either the central axis of the sensor IC 3 or the central axis of the permanent magnet 4 from the other.

Instead, in this ninth embodiment, both the central axis of the sensor IC 3 and the central axis of the permanent magnet 4 are offset from the central axis C in the radial direction of the rotating magnetic object 1.

Figure 11:
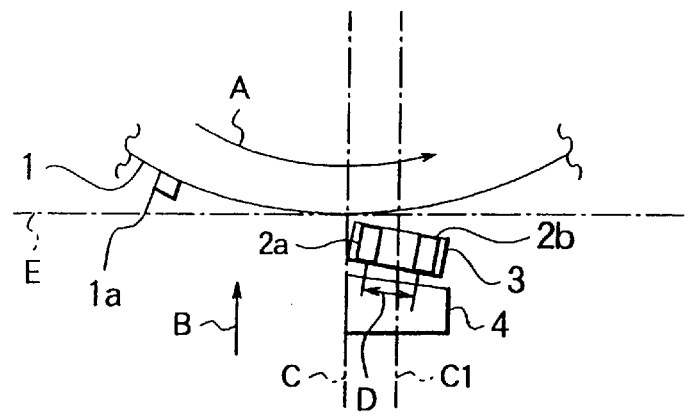
FIG. 11 is a side view illustrating the main part of a ninth embodiment according to the present invention.

FIG. 11 is a side view illustrating the main part of the ninth embodiment of the present invention. In this embodiment, as shown in FIG. 11, the central axis C1 of the sensor IC 3 and that of the permanent magnet 4 are offset in the forward direction of the movement of the rotating magnetic object 1 from the central axis C in the radial direction of the rotating magnetic object 1.

In the specific example shown in FIG. 11 the front surface of the sensor IC 3 and also the permanent magnet 4 are slanted. In other words, the techniques of the first to fifth embodiments described above are incorporated into this specific example.

The offsetting of the central axis C of the sensor IC 3 and the permanent magnet 4 from the central axis C in the radial direction of the rotating magnetic object 1 results in a difference between the amplitudes of the magnetic flux density applied to the magnetoelectric transducer elements 2a and 2b. More specifically, the bias magnetic field applied to the magnetoelectric transducer element 2a is greater than that applied to the magnetoelectric transducer element 2b.

The additional slanting of the front surfaces of the sensor IC 3 and the permanent magnet 4 leads to a further difference in the amplitude of the magnetic flux density, that is, the amplitude of the magnetic flux density applied to the magnetoelectric transducer element 2a becomes further greater than that applied to the magnetoelectric transducer element 2b.

Thus, as in the previous embodiments, it becomes possible to precisely detect both edges of the magnetic material protrusions 1a, and the detection performance (accuracy) of rotation is improved simply by adjusting the position of the sensor IC 3 or the permanent magnet 4. Furthermore, the detection accuracy at low rotation speeds is also improved, and a greater tolerance is allowed in attachment of the sensor.

Embodiment 10

In the first to ninth embodiments described above, although the unbalanced bias means is realized by introducing a structural or positional unbalance in the sensor IC 3 or the permanent magnet 4, the unbalanced bias means may also be realized by introducing imbalance in the circuit configuration of the sensor IC 3.

Thus, in this tenth embodiment, the circuit parameters of the sensor IC 3 are selected in such a manner as to produce such imbalance.

Figure 12:
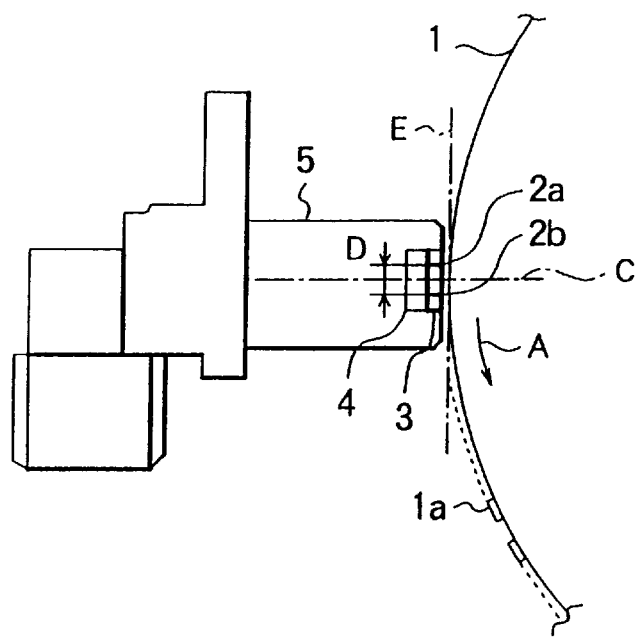
FIG. 12 is a cross-sectional view illustrating a conventional magnetic object motion sensor which is in operation.
Figure 13:
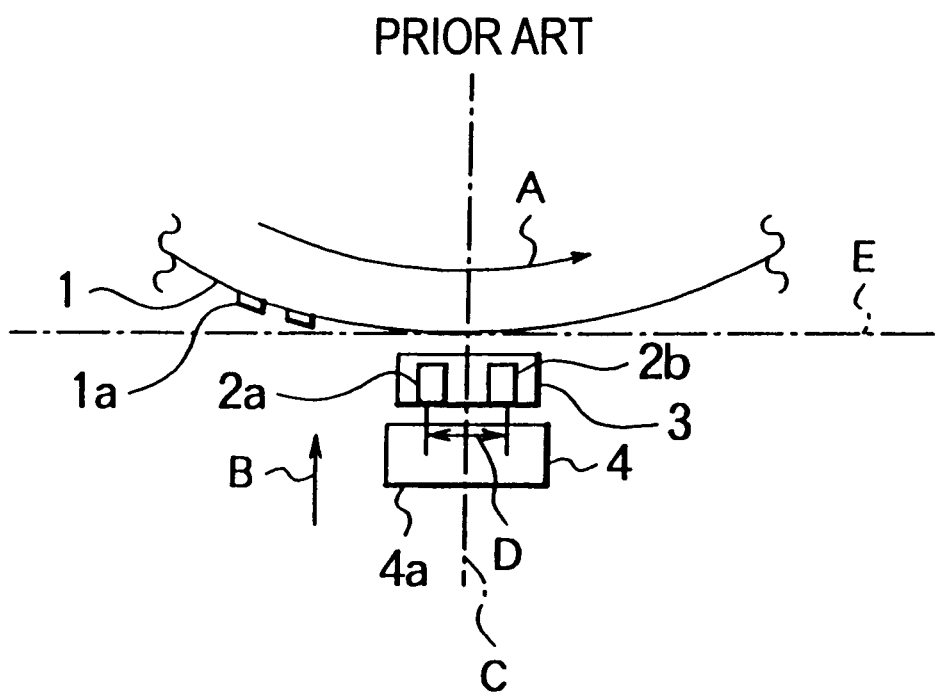
FIG. 13 is a side view illustrating the relative position of the conventional magnetic object motion sensor.

However, the sensor IC 3 and the permanent magnet 4 employed in this embodiment have no imbalance either in the structure or position as shown in FIG. 12 or 13.

Figure 14:
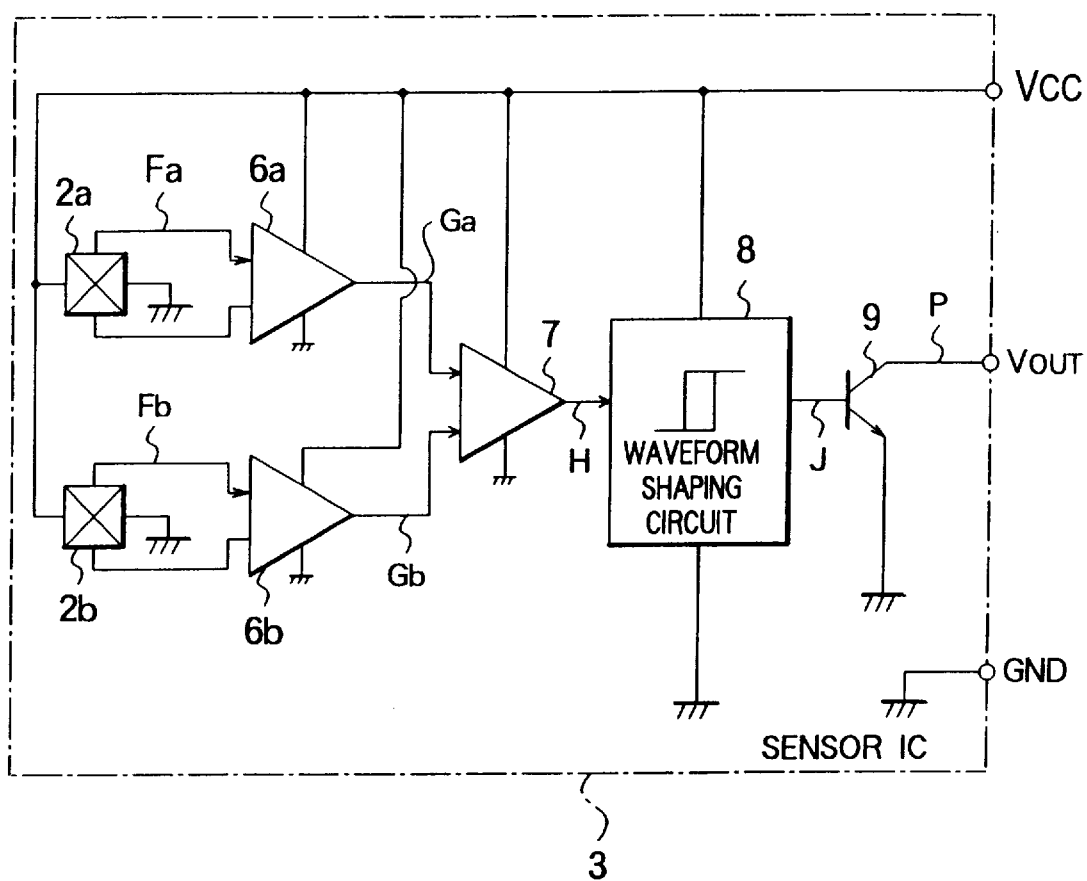
FIG. 14 is a circuit diagram illustrating a typical circuit configuration of a sensor IC.

The amplification factor of the pair of amplifiers 6a and 6b shown in FIG. 14 is unbalanced so that there is a difference between the amplitudes of the electric signals Ga and Gb applied to the differential amplifier 7. The degree of the imbalance in the amplification factor is set so that the difference in the amplitude between the electric signals Ga and Gb becomes greater than the hysteresis $\Delta T$ of the waveform shaping circuit 8. More specifically, of the amplifiers 6a and 6b of the sensor IC 3, for example the amplifier 6a connected to the magnetoelectric transducer element 2a disposed at the leading edge which meets the magnetic material protrusions 1a of the rotating magnetic object 1 earlier than the other magnetoelectric device 2b has a greater amplification factor (gain) than the other amplifier 6b.

In this embodiment, as described above, the gains of the amplifiers 6a and 6b which amplify the electric signals Fa and Fb supplied from the magnetoelectric transducer elements 2a and 2b are adjusted so that a difference occurs between the amplitudes of signals corresponding to the magnetic flux density applied to the magnetoelectric transducer elements 2a and 2b.

Thus, in this embodiment, it becomes possible to precisely detect both edges of the magnetic material protrusions 1a thereby improving the detection performance (accuracy) of rotation without having to modify the structure or the position of the rotating magnetic object 1, the sensor IC 3, and the permanent magnet 4. Furthermore, the detection accuracy at low rotation speeds is also improved, and a greater tolerance is allowed in attachment of the sensor.

What is claimed is:

1. A magnetic object motion sensor comprising:

a pair of magnetoelectric transducer elements disposed opposite a magnetic material protrusion of a rotating magnetic object;

a magnet for generating bias magnetic flux toward said pair of magnetoelectric transducer elements;

unbalanced biasing means for producing imbalance in the magnetic field detection sensitivity between said pair of magnetoelectric transducer elements;

a differential amplifier for amplifying in a differential fashion the electric signals output by said pair of magnetoelectric transducer elements;

a waveform shaping circuit for converting the differential signal output by said differential amplifier to a pulse signal corresponding to the edges of said magnetic material protrusion;

wherein said pair of magnetoelectric transducer elements are disposed in such a manner that one element is a predetermined distance apart from the other in the direction of motion of said rotating magnetic object to enable said pair of magnetoelectric transducer elements to detect a change in magnetic flux caused by the motion of said magnetic material protrusion;

the detection sensitivity of the magnetoelectric transducer element that said magnetic material protrusion passes over first is set lower by said unbalanced biasing means than the detection sensitivity of the other magnetoelectric transducer element by setting an angle of inclination $\alpha$ between said magnet and said pair of transducer elements in a range between five and sixty degrees, and said unbalanced bias producing means produces a difference in the amplitude of the magnetic flux density between that applied to one element of said pair of magnetoelectric transducer elements and that applied to the other element so that the difference in the electric signal level corresponding to said difference in the amplitude of the magnetic flux density becomes greater than the hysteresis of said waveform shaping circuit and so that a rapid change in magnetic flux density is produced and said differential signal changes abruptly when said magnetic material protrusion passes over said transducer elements.

* * * * *